May 28, 1968  S. E. CLEGG  3,385,208
BALLING MACHINE
Original Filed Sept. 22, 1964  3 Sheets-Sheet 3
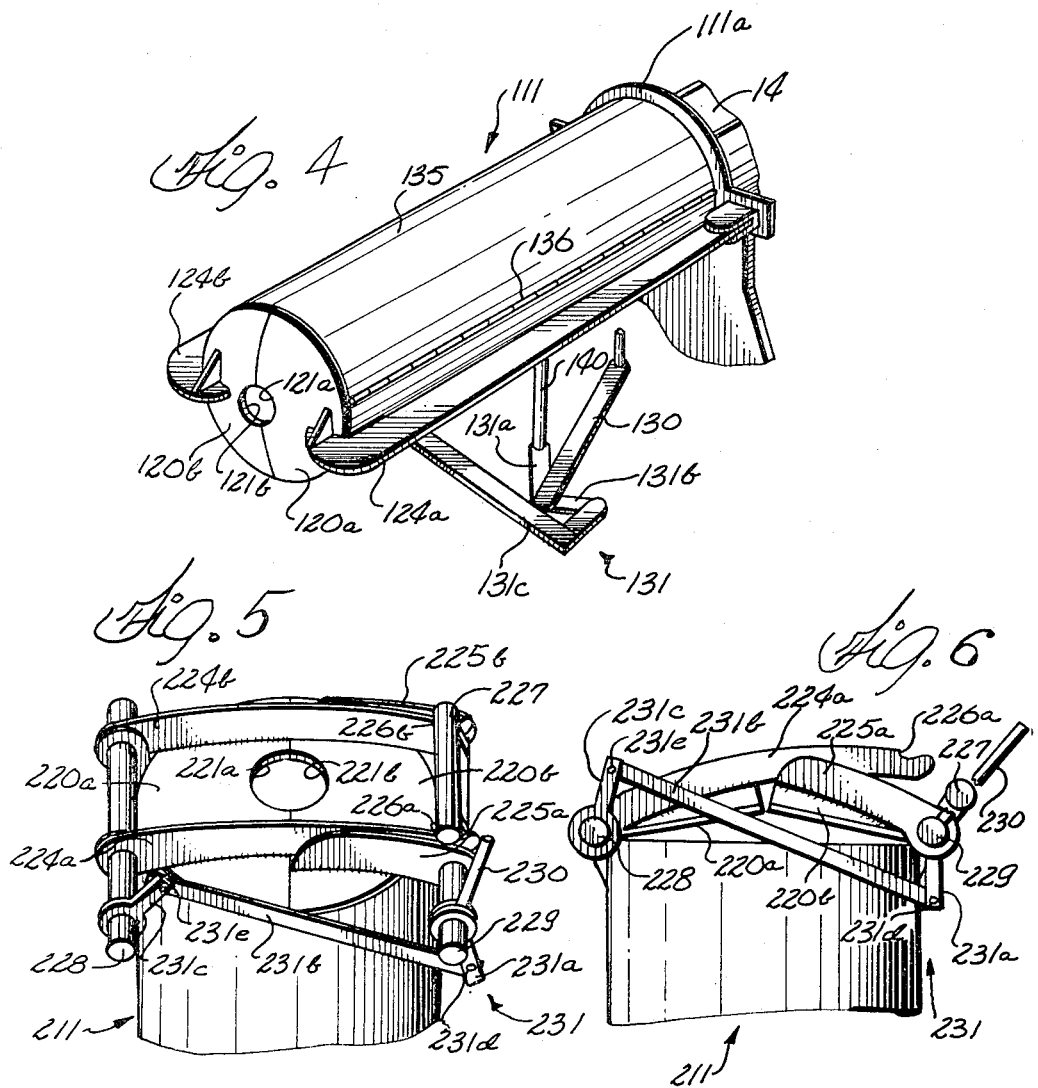
Inventor
Samuel E. Clegg
By
Pendleton, Neuman,
Seibold & Williams
Attorneys United States Patent Office 3,385,208
Patented May 28, 1968

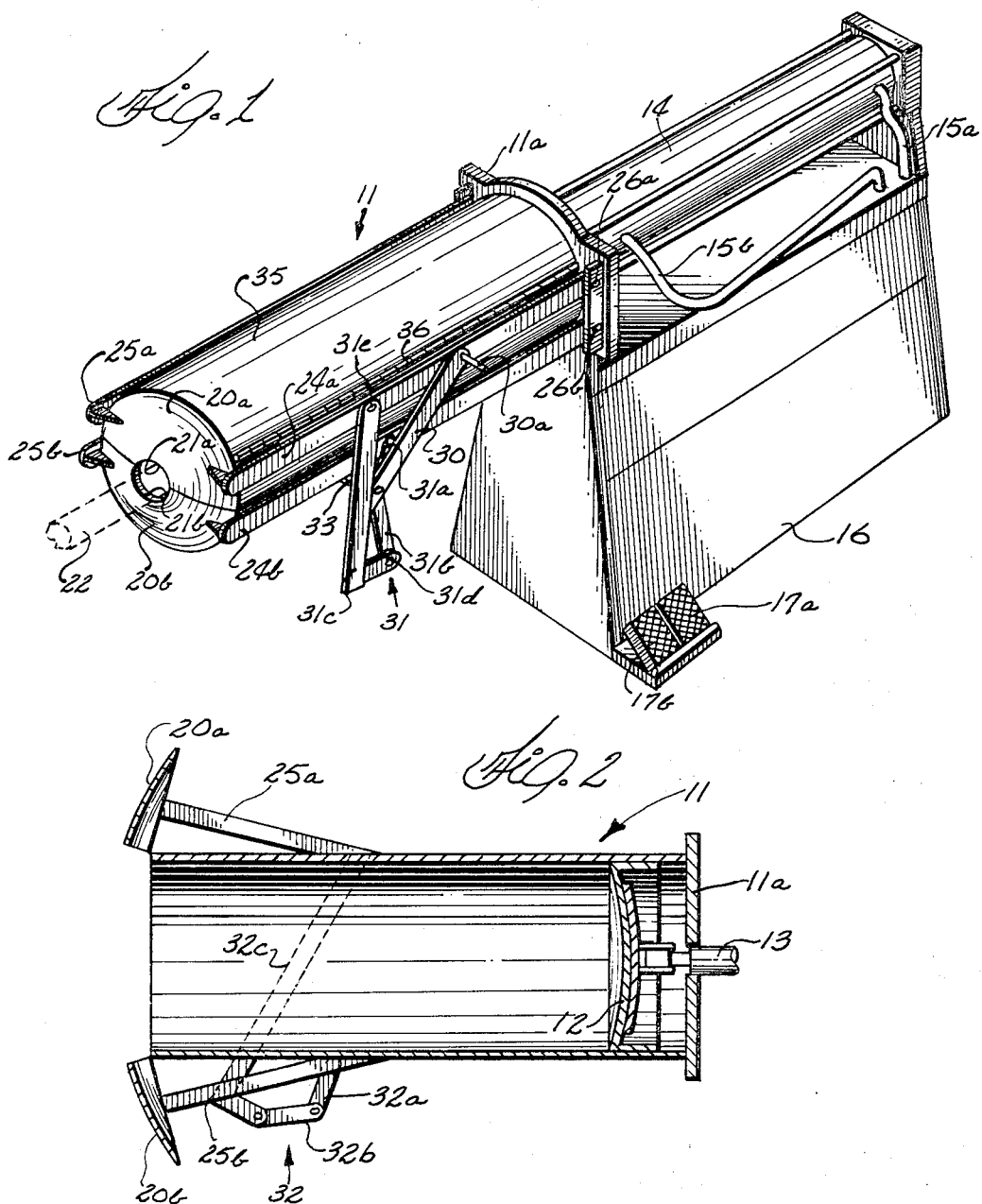

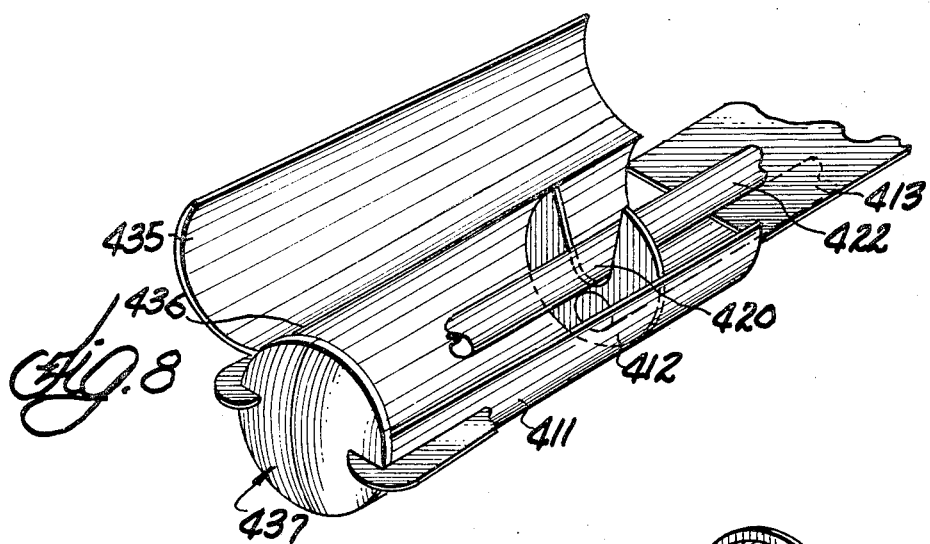
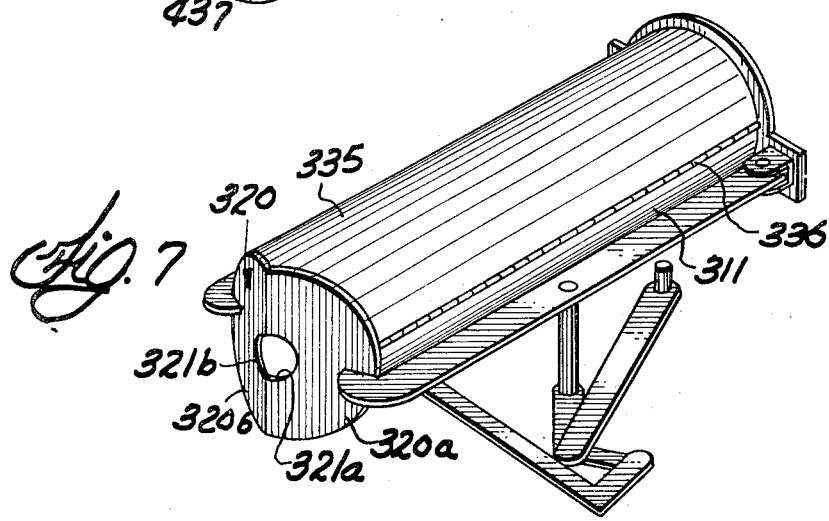
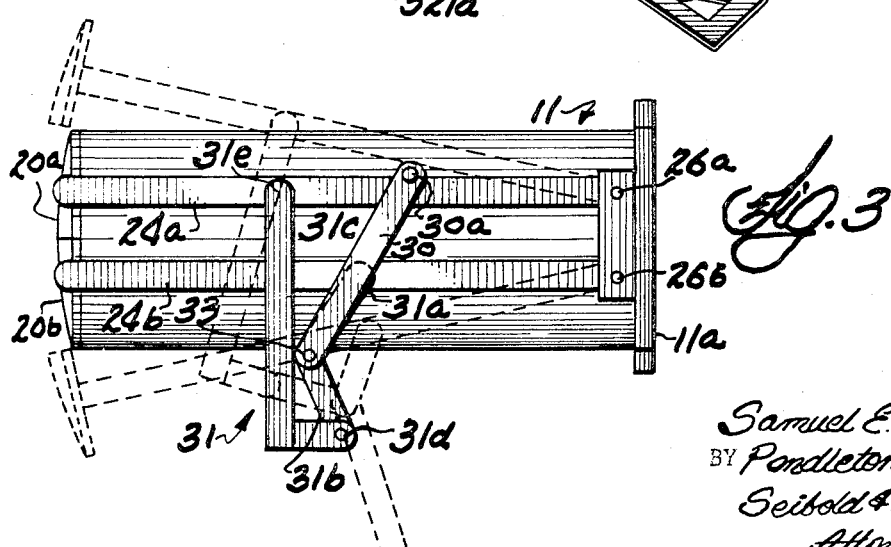

3,385,208
BALLING MACHINE
Samuel E. Clegg, 729 Bartlett Ave.,
Plainfield, Ill. 60544
Continuation of application Ser. No. 398,350, Sept. 22, 1964. This application Nov. 25, 1966, Ser. No. 597,177
11 Claims. (Cl. 100—218)

ABSTRACT OF THE DISCLOSURE

A balling machine is described for compressing the roots of a plant or tree, together with the earth in the vicinity of the roots, into a compact mass. The machine includes a cylindrical housing which is open at one end to receive a piston which is driven into the cylinder in the compressing operation. The opposite end of the cylinder is fitted with a closure member which may be swung away from the closed position so that the plant or tree may be pushed out the end into a suitable burlap or plastic sack. An opening is provided in either the piston or the closure member for receiving the trunk of the plant or tree.

---

This application is a continuation of application Ser. No. 398,350 filed Sept. 22, 1964, and which is now abandoned.

The present invention relates in general to balling machines and more specifically to apparatus for compressing the roots of an extracted tree or plant, together with the earth between and surrounding the roots, into a compact mass.

A principal object of the present invention is to provide a new and improved balling machine. More specifically, an object is to provide new and improved apparatus for compressing the roots of an extracted tree or plant, together with the earth between and surrounding the roots, into a compact mass.

Another object is to provide new and improved balling apparatus of the cylinder and piston type having a closure at one end of the cylinder made in separable sections which are readily moveable away from each other to allow for the insertion of a plant in the apparatus and the removal of the plant from the apparatus. A related object is to provide new and improved means for mounting the separable closure sections for movement toward and away from each other.

A general object of the present invention is to provide a new and improved balling machine characterized in its cost saving structure and ease of operation.

Other objects and advantages of the invention will become apparent upon reference to the attached detailed description taken in connection with the drawings wherein:

FIGURE 1 is a perspective view of a first embodiment of a balling mahine constructed in accordance with the teachings of the present invention;

FIG. 2 is a cross sectional view of the cylinder portion of the balling machine shown in FIG. 1 wherein the closure is disclosed in its open position;

FIG. 3 is a side view of the cylinder portion of the balling machine shown in FIG. 1 wherein the operation of the closure linkages is illustrated;

FIG. 4 is a perspective view of the cylinder portion of a second embodiment of a balling machine constructed in accordance with the teachings of the present invention;

FIG. 5 is a partial perspective view of the cylinder portion of a third embodiment of a balling machine constructed in accordance with the teachings of the present invention;

FIG. 6 is a side elevational view of the portion of the balling machine shown in FIG. 5 wherein the closure is disclosed in the partially open position;

FIG. 7 is a partial perspective view of the cylinder portion of a fourth embodiment of a balling machine constructed in accordance with the teachings of the present invention; and FIG. 8 is a partial perspective view of the cylinder portion of a fifth embodiment of a balling machine constructed in accordance with the teachings of the present invention.

While the invention has been shown and will be described in connection with certain preferred embodiments, it is to be understood that the invention is not to be limited to the disclosed embodiments but, on the contrary, the invention is intended to cover the various modifications and equivalent arrangements included within the spirit and scope of the appended claims.

Referring now to the drawings and more specifically to FIGS. 1, 2 and 3 a first embodiment of a balling machine constructed in accordance with the teachings of the present invention is disclosed. The balling machine includes a horizontally disposed cylindrical housing 11 having a chamber into which the roots of a tree or plant are inserted subsequent to the removal thereof from the ground. For the purpose of compressing the roots, together with the earth between and surrounding the roots, into a compact mass, a piston 12 is provided within the housing. As will be readily apparent, the piston 12 may be driven through an associated piston rod 13 by any suitable means. In the exemplary arrangement, the piston 12 is operatively driven through the piston rod 13 by a hydraulic cylinder 14. In order to drive the piston 12 in the forward direction, to the left as viewed in FIGS. 1 and 2, fluid pressure is applied to the cylinder 14 through tubing 15a. Conversely, the piston 12 is driven in the rearward direction, to the right as viewed in FIGS. 1 and 2, by applying fluid pressure to the cylinder 14 through tubing 15b. Since any suitable means, such as the combination of a pump, motor and control valve, may be employed for controlling the application of fluid pressure to the hydraulic cylinder 14 through tubing 15a and 15b and since such means are well known to those skilled in the art, the details thereof will not be set forth. Suffice it to say that suitable means are provided within an enclosure 16 and that the application of fluid pressure to the hydraulic cylinder 14 is controlled by depressing foot pedals 17a and 17b, pedal 17a controlling the forward movement of the piston 12 and pedal 17b controlling the rearward movement thereof.

To allow for the insertion within the cylinder 11 and the removal therefrom of the roots of a selected tree or plant, the left end of the housing 11, as viewed in FIGS. 1 and 2, is closed by a closure including a pair of semi-circular separable closure members 20a and 20b. As may be seen, the closure members 20a and 20b are respectively provided with registering semi-circular recesses or slots 21a and 21b for receiving the trunk 22 of a tree or plant when the apparatus is in the closed position, shown in FIG. 1.

In accordance with the present invention, new and improved means are provided for supporting the closure me members 20a and 20b and for causing the closure members to be moved toward and away from each other to allow for the insertion and removal of the roots of a tree or plant. In the exemplary arrangement, the closure member 20a is suitably secured, such as by welding, to a pair or brackets 24a and 25a which are mounted on the base 11a of the housing for pivotal movement about associated pins, only the pivot pin 26a for the bracket 24a being viewable in FIG. 1. In like manner, the closure member 20b is suitably secured, such by welding, to a pair of brackets 24b and 25b. Similarly, the brackets 24b and 25b are mounted on the housing base 11a for pivotal movement about associated pins, only the pivot pin 26b for the bracket 24b being viewable in FIG. 1. Consequently, the brackets 24a, 24b and 25a, 25b and thus the closure members 20a and 20b are pivotal about axes which are perpendicular to the axis or centerline of the cylindrical housing 11.

In keeping with the present invention, means are provided for causing the brackets 24a and 24b and the brackets 25a and 25b to be moved toward and away from each other whereby the closure members 20a and 20b are moved toward and away from each other. In the exemplary arrangement, the operation of which is shown in FIG. 3, a lever 30 and a pair of link assemblies 31 and 32 are provided for imparting such movement to the closure members. The link assemblies 31 and 32 are connected together for concurrent operation by a linking pin or rod 33 which is secured to the lever 30 for rotational movement therewith. The link assembly 31 includes (1) a link 31a which is fixedly secured to the bracket 24b and which has an aperture or bore adapted to receive the linking pin or rod 33, (2) a link 31b secured to the linking pin or rod 33 so that rotational movement is imparted thereto when rotational movement is imparted to the lever 30, and (3) and angle link 31c which is connected to the link 31b through a pivot pin 31d and which is connected to the bracket 24a through a pivot pin 31e. The link assembly 32 is identical to the link assembly 31 and, therefore the details thereof will not be set forth. Suffice it to say that the link assembly 32 is provided with corresponding links 32a–32c.

A brief description of the operation of the lever 30 and the link assemblies 31 and 32 may be helpful in understanding the present invention. For this purpose, let it be assumed that the lever 30 and the link assemblies 31 and 32 are initially in the positions shown in FIG. 1 so that the closure members 20a and 20b are in their closed positions. When the handle 30a on the lever 30 is manually grasped and the lever is manually pivoted in the clockwise direction, corresponding clockwise rotation about its own axis is imparted to the linking pin 33 to which the handle is fixedly attached. Moreover, corresponding clockwise pivotal movement about the linking pin is imparted to the links 31b and 32b, also fixedly attached to linking pin 33, causing the links 31c and 32c to pivot about associated pivot pins (pin 31e for link 31c) toward the position show in FIG. 2. As a result, upward torque is imparted to the brackets 24a and 25a so that they rotate upwards about their associated pins (pin 26a for bracket 24a) and the closure member 20a is thus driven upwardly, whereas downward torque is imparted to the brackets 24b and 25b so that they rotate downwardly about their associated pins (pin 26b for bracket 24b) and the closure member 20b is thus also driven downwardly. When the lever 30 has been pivoted in the clockwise direction so that the closure members 20a and 20b are in their fully open positions as shown in FIG. 2, the roots of a tree or plant may readily be inserted within or removed from the housing 11. Subsequently, when the lever 30 is pivoted in the counterclockwise direction, it will be apparent that the closure members 20a and 20b are moved to their closed positions.

In keeping with the present invention, the closure members 20a and 20b are so constructed that, when they are in abutting relationship, the closure forms a segment of a hollow sphere. This allows the closure portions 20a and 20b to be pivoted outwardly from the position shown in FIG. 1 without binding or scraping against the side wall of the housing 11. Additionally, this allows for providing a tight seal between the closure members 20a and 20b and the housing 11, the edges of the closure members 20a and 20b moving into sealing relationship with the housing wall when the closure members are moved to their closed positions shown in FIG. 1. Consequently, no auxiliary sealing means, such as overlapping closure member edges, need be provided to effect a tight seal between the closure members 20a and 20b and the housing 11, as has been required in prior conventional apparatus of this type.

In order to allow for the insertion of dirt within the housing 11, when disposed in a horizontal position as shown, subsequent to the insertion of the roots of a tree or plant therein, the housing is provided with a top cover 35 which is secured thereto for pivotal movement by hinges 36. Suitable means (not shown) are provided for locking the top cover 35 in the closed position, shown in FIG. 1. Subsequent to the insertion of the roots of a tree or plant within the housing and the closure of the closure members 20a and 20b, the cover 35 may be unlocked and swung to its open position so that dirt or a desired mix may be inserted in the housing for compression with the roots and the earth between and surrounding the roots.

A brief description of the overall operation of the balling machine disclosed in FIGS. 1, 2 and 3 may now be helpful in understanding the present invention. For this purpose, it will be assumed that the balling machine is initially in the condition shown in FIG. 1. First, clockwise pivotal movement is imparted to the lever 30 so that the closure members 20a and 20b are pivoted away from each other to their fully open positions shown in FIG. 2. The roots of a tree or plant are then inserted within the housing 11 and the lever 30 is pivoted in the counterclockwise direction until the closure members 20a and 20b are pivoted to their fully closed positions shown in FIG. 1, the trunk 22 of the tree or plant being received within the recesses or grooves 21a and 21b. At this time, the cover 35 is unlocked and is swung to the open position so that dirt or a desired mix may be inserted into the housing. The cover 35 is then closed and locked. The balling machine is then in condition for a compressing operation. To initiate the compressing operation, an operator depresses the foot pedal 17a which causes fluid pressure to be applied to the hydraulic cylinder 14 through tubing 15a so that the piston 12 is driven in the forward direction to compress the roots, together with the earth between and surrounding the roots, into a compact mass. The operator then releases the foot pedal 17a, pivots the lever 30 in the clockwise direction so that the closure members 20a and 20b are again moved to their fully open positions and again depresses the pedal 17a to cause the compact mass to be driven out of the housing 11. The pedal 17b is then depressed to retract the piston 12 and the operation may then be repeated with another tree or plant.

Referring to FIG. 4, a second embodiment of the cylindrical housing portion, constructed in accordance with the teachings of the present invention, is shown which may be substituted for the cylindrical housing portion in FIGS. 1, 2 and 3. The second cylindrical housing portion likewise includes a horizontally disposed cylindrical housing 111 having a chamber adapted to receive the roots of a tree or plant and having the forward end thereof closed by a closure which includes a pair of semicircular separable closure members 120a and 120b. The closure members are similarly provided with semi-circular recesses or grooves 121a and 121b which register to receive the trunk of a tree or plant when the members 120a and 120b are in their closed positions, shown in FIG. 4. In keeping with the present invention, the closure members 120a and 120b are also designed so that the closure forms a segment of a hollow sphere when in the closed position. Additionally, a corresponding top cover 135 is provided in the housing 111 to allow for the insertion of dirt or a desired mixture within the housing subsequent to the insertion of the roots of a tree or plant therein, the cover being secured to the housing for pivotal movement about hinges 136. Finally, the housing 111 is provided with a piston (not shown) for compressing the roots and associated earth within the housing. The piston corresponds to piston 12 in FIGS. 1 and 2 and likewise may be hydraulically driven.

In accordance with the present invention, new and improved means are likewise provided for causing the closure members 120a and 120b to be moved toward and away from each other whereby the forward end of the housing 111 is caused to be closed or opened. In this exemplary arrangement, the closure member 120a is suitably secured, such as by welding, to a bracket 124a which is mounted on the base 111a of the housing for pivotal movement. In like manner, the closure member 120 is suitably secured, such as by welding, to a bracket 124b which in turn is pivotally mounted on the cylinder base 111a. For the purpose of controlling the opening and closing of the closure, a lever 130 and a link assembly 131 have been provided which respectively correspond to the lever 30 and the link assemblies 31 and 32 in FIGS. 1, 2 and 3. With the present arrangement, the link 131a is fixedly secured to the bracket 124a through the connecting post or pin 140 whereas the angle link 131c is pivotally secured to the bracket 124b. Consequently, the brackets 124a and 124b and thus the closure members 120a and 120b are pivotable about axes perpendicular to the axis of the cylindrical housing 111.

In operation of the apparatus shown in FIG. 4, clockwise movement is imparted to the lever 130 to open the closure. Since the details of the operation of the lever 130 and the link assembly 131 correspond to that disclosed above with respect to FIG. 1, the details thereof will not be set forth. Suffice it to say that, when clockwise movement is imparted to the lever 130, the brackets 124a and 124b are pivotally moved away from each other whereby the closure members 120a and 120b are likewise pivotally moved away from each other to their open positions to allow for the insertion or removal of the roots of a tree or plant. Subsequent to the insertion or removal of the roots of a plant or tree, the lever 130 is pivoted in the counterclockwise direction to cause the brackets 124a and 124b to be pivoted toward one another whereby the closure members 120a and 120b are pivoted into engagement with each other, i.e., the closure members are moved to their closed positions.

Referring to FIGS. 5 and 6, a portion of a third embodiment of the cylindrical housing portion, constructed in accordance with the teachings of the present invention, is shown which may likewise be substituted for the cylindrical housing portion in FIGS. 1, 2 and 3. However, in this arrangement, a vertically disposed cylindrical housing 211 having a chamber adapted to receive a tree or plant is disclosed, whereas the housings 11 and 111 in FIGS. 1–4 are disclosed as being horizontally disposed. It will be readily appreciated, though, that any of the disclosed housings may either be vertically disposed or horizontally disposed and the invention is intended to cover any such dispositions of the housings. The upper end of the housing 211 is closed by a closure including a pair of semi-circular separable closure members 220a and 220b. The closure members 220a and 220b likewise have semi-circular recesses or grooves 221a and 221b which are adapted to register for receiving the trunk of a tree or plant when the closure members are in their closed positions, shown in FIG. 5. Additionally, a piston (not shown) which may correspond to piston 12 in FIGS. 1 and 2 and which may be hydraulically actuated, is provided in the housing 211 for compressing roots and associated earth therein.

In accordance with the present invention, new and improved means are also provided for causing the closure members 220a and 220b to be pivoted toward and away from each other whereby the upper end of the housing 211 is caused to be closed or opened. In this arrangement, the closure member 220a is suitably secured, such as by welding, to a pair of brackets 224a and 224b which in turn are secured to a shaft 228 for pivotal movement thereabout when rotational movement is imparted thereto. In like manner, the closure member 220b is suitably secured, such as by welding, to a pair of brackets 225a and 225b which are secured to a shaft 229 for pivotal movement thereabout when rotational movement is imparted thereto. The shafts 228 and 229 are suitably mounted on opposite sides of the housing 211 for rotational movent. Accordingly, the closure members 220a and 220b are likewise pivotable about axes perpendicular to the axis of the cylindrical housing 211.

For the purpose of imparting rotational movement to the shafts 228 and 229 whereby pivotal movement is imparted to the closure members 220a and 220b, a lever 230 and a link assembly 231 have been provided. The lever 230 is secured directly to the shaft 229 for imparting direct rotational movement thereto when pivotal movement is imparted to the lever. On the other hand, the lever 230 is connected to the shaft 228 through the link assembly 231 for imparting rotational movement thereto when pivotal movement is imparted to the lever. The link assembly 231 includes a link 231a fixedly secured to the shaft 229 for pivotal movement thereabout, a link 231c fixedly secured to the shaft 228 for pivotal movement thereabout and a connecting link 231b respectively connected to the links 231a and 231c through pivot pins 231d and 231e.

When clockwise movement is imparted to the lever 230, clockwise rotational movement is imparted to the shaft 229 causing the closure member 220b to be pivoted in the clockwise direction thereabout. At the same time, clockwise movement about the shaft 229 is imparted to the link 231a causing the link 231b to be driven to the left as viewed in FIG. 5. In response thereto, counterclockwise movement about the shaft 228 is imparted to the lever 231c so that a counterclockwise rotational movement is imparted to the shaft 228. Consequently, the closure member 220a is pivoted in the counterclockwise direction about the shaft 228. Thus, by imparting clockwise rotational movement to the lever 230 about the shaft 229, the closure members 220a and 220b may be pivoted to their open positions. It follows then that, by imparting counterclockwise movement to the lever 230 about the shaft 229, the closure members 220a and 220b may be pivoted to their closed positions.

In keeping with the present invention, means are provided for locking the closure members 220a and 220b in their closed positions so that the closure members are not driven to their open positions as the roots and associated earth are compressed in the housing 211. For this purpose, the brackets 224a and 224b are provided with recesses or grooves 226a and 226b which are adapted to receive a locking bar or rod 227. The locking bar or rod 227 is mounted for relative pivotal movement about the shaft 229. When the locking bar or rod 227 is positioned in the grooves 226a and 226b as shown in FIG. 5, the closure members 220a and 220b are locked in their closed positions since the locking bar or rod prevents the closure member 220a from pivoting in a counterclockwise direction about the shaft 228. When it is desired to open the upper end of the cylinder 211, the locking bar or rod 227 is pivoted in the clockwise direction about the shaft 229 to a position corresponding to that shown in FIG. 6. Subsequently, the lever 230 may be rotated in the clockwise direction to cause the closure members 220a and 220b to be moved to their open positions. When the closure members 220a and 220b have thereafter been moved to their closed positions by imparting counterclockwise movement to the lever 230, counterclockwise movement may be imparted to the locking bar or rod 227 to move the bar or rod into the grooves 226a and 226b whereby the closure members are again locked in their closed positions.

Referring to FIG. 7, a fourth embodiment of the cylindrical housing portion and associated closures, constructed in accordance with the teachings of the present invention, is shown which may be substituted for the cylindrical housing portion and associated closures in FIGS. 1, 2 and 3. The fourth cylindrical housing includes a horizontally disposed cylindrical housing 311 having a chamber adapted to receive the roots of a tree or plant and having the forward end thereof closed by a closure 320 comprising separable members 320a and 320b. In this embodiment, however, the closure members are formed of flat material and, in order to use the previously disclosed means for positioning the closure members, the forward end of the associated cylindrical housing must be tapered rearwardly to form a V shaped, pointed forward end adapted to receive the flat closure members in sealing relationship therewith, as shown in FIG. 7. The closure members may then be of semi-elliptical shape and designed to cover merely the associated opening in the cylinder. It is apparent, however, that such a shape is not strictly necessary and that, for example, a rectangular plate of length at least as great as the inside diameter of the cylinder and of sufficient width to cover the associated opening in the cylinder would be equally satisfactory. The mating edges of the closure members 320a and 320b are cut so as to form a sealing relationship with each other. The closure members are provided with recesses or grooves 321a and 321b which register to receive the trunk of a tree or plant when members 320a and 320b are in their closed position. The recesses 321a and 321b are preferably of semi-elliptical shape so as to present the appearance of a circular aperture when the closure members are in their closed position and viewed along the axis of the cylinder. This semi-elliptical shape is not strictly required and may be varied for ease in manufacture. Additionally, a corresponding top cover 335 is provided in the housing 311 to allow for insertion of dirt or a desired mixture within the housing subsequent to the insertion of the roots of a tree or plant therein, the cover being anchored to the housing for pivotal movement about hinges 336. However, if top cover 335 is to be opened while the closure members 320a and 320b are in their closed position, the portions of the closure members adjacent the top cover must take the previously mentioned semi-elliptical shape. The housing 311 is provided with a piston (not shown) for compressing the roots and associated earth within the housing. The piston corresponds to piston 12 in FIGS. 1 and 2 and likewise may be hydraulically driven. Finally, a means must be provided for causing the closure 320 to be moved toward and away from the closed position whereby the forward end of the housing 311 is caused to be closed or opened. Any of the exemplary means shown in FIGS. 1 through 6 may be adapted for use in this embodiment. That of FIG. 4 is shown in FIG. 7. The method of operation is similar to that which has previously been described and will not be repeated here.

Referring to FIG. 8, another embodiment of the cylindrical housing and piston portions, constructed in accordance with the teachings of the present invention, is shown which may be substituted for the cylindrical housing and piston portions in FIGS. 1, 2 and 3. The cylindrical housing 411 is likewise horizontally disposed and has a chamber adapted to receive the roots of a tree or plant, the forward end being provided with appropriate means for closure. In this embodiment the trunk of the tree or plant 422 extends to the rear of the cylinder when the tree or plant is positioned within the machine. It is apparent that it is not necessary for the means of closure at the forward end of the cylinder to have any capability of accepting any part of the tree or plant. Thus, for example, no grooves or recesses in the closure, as were present in the embodiments of FIGS. 1 through 7, need be provided, and a simplified means of forming a closure with a sealing relationship to the forward end of the cylinder will be sufficient. In the exemplary arrangement, however, a closure means 437 pivotally mounted from a remote position on the cylinder, similar to that of FIG. 4 is indicated. Its operation has previously been presented and will not be further discussed here. The piston 412 has a recess or cutout 420 to accept the trunk of the tree or plant. The piston 412 is driven by the associated piston rod 413 as in the previous embodiments, but it is apparent the point of attachment of the piston and piston rod will be offset from the center of the piston to make room for trunk 422. Also, a corresponding top cover 435, shown in its raised position in FIG. 8, is provided for the housing 411 to allow for insertion of dirt or a desired mixture within the housing subsequent to the insertion of the roots of a tree or plant therein, the cover being secured to the housing for pivotal movement about hinges 436. The overall operation of the apparatus is similar to that of the embodiment of FIGS. 1 and 2 and will not be repeated.

As may be seen, the claims are directed to apparatus for compressing the roots of an extracted plant. However, the invention is intended for use in compressing the roots of any desired extracted plant or tree and the term plant as used in the claims is intended to cover any desired tree or plant.

Further modifications will be apparent to those skilled in the art and it is desired, therefore, that the invention be limited only by the scope of the appended claims.

What is claimed is:

1. In apparatus for compressing the roots of an extracted plant together with the earth between and surrounding the roots into a compact mass the combination which comprises a cylindrical housing having a chamber into which the roots and earth are introduced, a closure for one end of the housing which surrounds the trunk of the plant and which includes two separate sections, a piston in the housing adapted to be moved axially with respect thereto for compressing the roots and the earth within the housing between the piston and the closure, means forming a part of the housing wall and adapted for movement away from the cylinder to allow for the insertion of additional earth into the cylinder, and two means each rigidly secured at one end to a respective section of the closure members, the other end of each being pivotally mounted on an axis perpendicular to the housing axis to allow for insertion of the roots of the plant within the housing and removal of the plant and compact mass from the housing.

2. In apparatus for compressing the roots of an extracted plant together with the earth between and surrounding the roots into a compact mass the combination which comprises a cylindrical housing having a chamber into which the roots and earth are introduced, a closure for one end of the housing which surrounds the trunk of the plant and which includes a pair of separable sections, a piston in the housing adapted to be moved axially with respect thereto for compressing the roots and the earth within the housing between the piston and the closure, and means including two pairs of beams to which the closure sections are respectively secured and which are pivotally secured to the housing at the end thereof opposite the end with which the closure is associated to allow for pivotal movement of the closure sections toward and away from each other about axes disposed perpendicular to the housing axis and thereby to allow for insertion of the plant within the housing and removal of the plant and compact mass from the housing.

3. In apparatus for compressing the roots of an extracted plant together with the earth between and surrounding the roots into a compact mass the combination which comprises a cylindrical housing having a chamber into which the roots and earth are introduced, a closure for one end of the housing which surrounds the trunk of the plant and which includes two separable sections, a piston in the housing adapted to be moved axially with respect thereto for compressing the roots and the earth within the housing between the piston and the closure, and means including two beams to which the closure sections are respectively secured and which are pivotally secured to the housing at the end thereof opposite the end with which the closure is associated to allow for pivotal movement of the closure sections toward and away from each other about axes disposed perpendicular to the housing axis and thereby to allow for insertion of the plant within the housing and removal of the plant and compact mass from the housing.

4. In apparatus for compressing the roots of an extracted plant together with the earth between and surrounding the roots into a compact mass the combination which comprises a cylindrical housing having a chamber into which the roots and earth are introduced, a closure for one end of the housing which surrounds the trunk of the plant and which includes two separable sections, a piston in the housing adapted to be moved axially with respect thereto for compressing the roots and the earth within the housing between the piston and the closure, means for mounting the closure sections for pivotal movement toward and away from each other about axes disposed perpendicular to the housing axis to allow for insertion of the plant in the housing and removal of the plant and compact mass from the housing, and means operable to simultaneously and pivotally move the closure sections between open and closed positions and operable to lock the closure sections in the closed positions.

5. In apparatus for compressing the roots of an extracted plant together with the earth between and surrounding the roots into a compact mass the combination which comprises a cylindrical housing having a chamber into which the roots and earth are introduced, a closure for one end of the housing which surrounds the trunk of the plant and which includes two separable sections, a piston in the housing adapted to be moved axially with respect thereto for compressing the roots and the earth within the housing between the piston and the closure, means for mounting the closure sections on the associated end of the housing for pivotal movement toward and away from each other about axes disposed perpendicular to the housing axis to allow for insection of the plant in the housing and removal of the plant and compact mass from the housing, means concurrently operable to pivotally move the closure sections between open and closed positions such that no portion of said means extends over the end of said housing when the closure sections are in their open position, and means operable to lock the closure sections in the closed positions.

6. In apparatus for compressing the roots of an extracted plant together with the earth between and surrounding the roots into a compact mass the combination which comprises a cylindrical housing having a chamber into which the roots and earth are introduced, closure means for one end of the housing, piston means in the housing adapted to be moved axially with respect thereto for compressing the roots and the earth within the housing between the piston means and the closure means, one of said means being provided with an opening through which the plant extends and means pivotally secured to the end of the housing opposite the end with which the closure means is associated for supporting the closure means to provide movement of the closure means between a position sealing said cylindrical housing and a position removed therefrom and thereby to allow for insertion of the plant within the housing and removal of the plant and compact mass from the housing.

7. The combination of claim 6 further including means forming part of the housing wall and adapted for movement away from the cylinder to allow for insertion of additional earth into the cylinder.

8. In apparatus for compressing the roots of an extracted plant together with the earth between and surrounding the roots into a compact mass the combination which comprises a cylindrical housing having a chamber into which the roots and earth are introduced, a closure for one end of the housing which surrounds the trunk of the plant, the closure forming a segment of a hollow sphere and having two separable semi-circular sections, a piston in the housing adapted to be moved axially thereof for compressing the roots and the earth within the housing between the piston and the closure, and means for mounting the closure sections for pivotal movement toward and away from each other about axes disposed perpendicular to the housing axis to allow for insertion of the plant in the housing and removal of the housing.

9. In apparatus for compressing the roots of an extracted plant together with the earth between and surrounding the roots into a compact mass the combination which comprises a cylindrical housing having a chamber into which the roots and earth are introduced, closure means for one end of the housing which includes two separable sections, piston means in the housing adapted to be moved axially with respect thereto for compressing the roots and the earth within the housing between the piston means and the closure means, said piston means being provided with an opening through which the trunk extends, and means including two beams to which the closure sections are respectively secured and which are pivotally secured to the housing at the end thereof opposite the end with which the closure is associated to allow for pivotal movement of the closure sections toward and away from each other about axes disposed perpendicular to the housing axis and thereby to allow for insertion of the plant within the housing and removal of the plant and compact mass from the housing.

10. In apparatus for compressing the roots of an extracted plant together with the earth between and surrounding the roots into a compact mass the combination which comprises a cylindrical housing having a chamber into which the roots and earth are introduced, closure means for one end of the housing, piston means in the housing adapted to be moved axially with respect thereto for compressing the roots and the earth within the housing between the piston means and the closure means, said piston means being provided with an opening through which the plant extends and means to allow for pivotal movement of the closure means between a position sealing said cylindrical housing and a position removed therefrom.

11. In apparatus for compressing the roots of an extracted plant together with the earth between and surrounding the roots into a compact mass, the combination which comprises a cylindrical housing having a chamber into which the roots and earth are introduced, closure means for one end of the housing, piston means in the housing adapted to be moved axially with respect thereto for compressing the roots and the earth within the housing between the piston means and the closure means, said piston means having a slot to permit the plant to be inserted therein, and means pivotally secured to the housing and supporting the closure means to provide movement of the closure means between a position sealing said cylindrical housing and a position removed therefrom.

References Cited

UNITED STATES PATENTS

| | | | |
|---|---|---|---|
| 234,983 | 11/1880 | Hoeften | 100—218 |
| 1,121,571 | 12/1914 | Sheppard | 100—218 |
| 1,737,411 | 11/1929 | Deans | 220—38 |
| 2,669,065 | 2/1954 | Clegg | 47—37 |
| 2,698,500 | 1/1955 | Clegg | 100—250 |

FOREIGN PATENTS 403,474   12/1933   Great Britain.

BILLY J. WILHITE, *Primary Examiner.*

UNITED STATES PATENT OFFICE
CERTIFICATE OF CORRECTION

Patent No. 3,385,208                              May 28, 1968

Samuel E. Clegg

It is certified that error appears in the above identified patent and that said Letters Patent are hereby corrected as shown below:

Column 1, lines 33 and 34, "specificolly" should read -- specifically --; line 55, "mahine" should read -- machine --. Column 2, line 59, cancel "me"; line 64, "or" should read -- of --. Column 8, line 24, "separate" should read -- separable --. Column 9, line 30, "insection" should read -- insertion --. Column 10, line 58, "Hoeften" should read -- Hoefjen --.

Signed and sealed this 11th day of November 1969.

(SEAL)
Attest:

Edward M. Fletcher, Jr.                          WILLIAM E. SCHUYLER, JR.
Attesting Officer                                   Commissioner of Patents